T. H. TAYLOR.
TRAP.
APPLICATION FILED SEPT. 29, 1910.
1,003,303.
Patented Sept. 12, 1911.
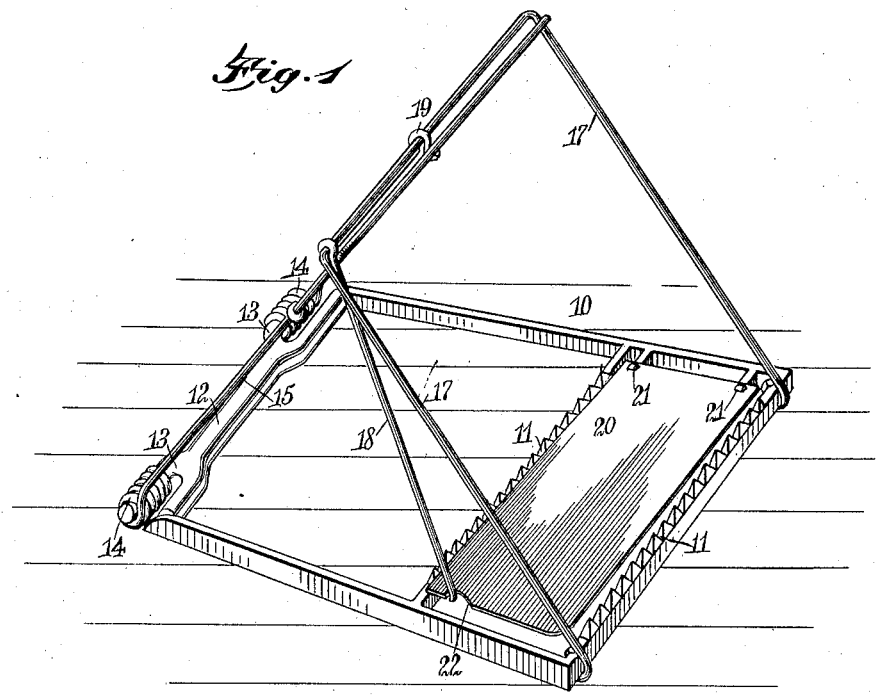
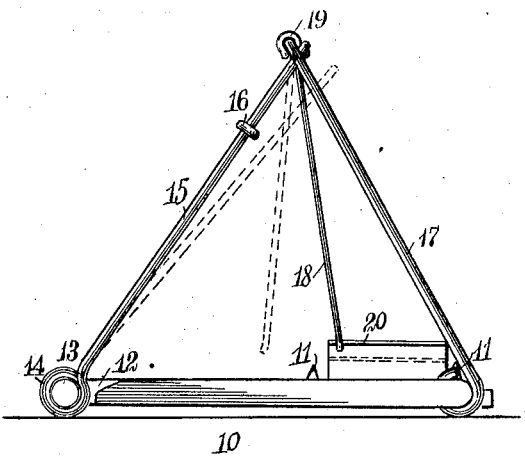
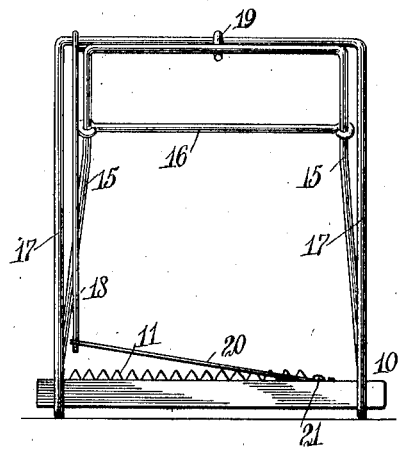
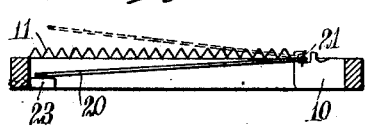
WITNESSES:
INVENTOR
Thomas H. Taylor
BY
ATTORNEYS

UNITED STATES PATENT OFFICE.

THOMAS H. TAYLOR, OF LUZERNE, NEW YORK.

TRAP.

1,003,303. Specification of Letters Patent. Patented Sept. 12, 1911.

Application filed September 29, 1910. Serial No. 584,431.

*To all whom it may concern:*

Be it known that I, THOMAS H. TAYLOR, a citizen of the United States, and a resident of Luzerne, in the county of Warren and State of New York, have invented new and useful Improvements in Traps, of which the following is a full, clear, and exact description.

The invention relates to improvements in traps such as are described and shown in Letters Patent of the United States Number 654,928, granted July 31, 1900.

An object of the invention is to provide a trap for efficiently and securely trapping animals and the like. For the purpose mentioned, use is made of a fixed toothed jaw constituting a base, a swinging jaw mounted on the toothed jaw, a tripping rod for engagement with the swinging jaw, and a tripping plate on the fixed jaw and adapted to be releasably engaged by the tripping rod.

Reference is to be had to the accompanying drawings, forming a part of this specification, in which similar characters of reference denote corresponding parts in all the views, and in which—

Figure 1 is a perspective view of the trap and showing the same in operative position; Fig. 2 is a side elevation of the device; Fig. 3 is a front view; and Fig. 4 is a fragmentary sectional view of the fixed jaw and disclosing the tripping plate mounted thereon.

Referring more particularly to the drawings, a fixed jaw 10 is employed having a plurality of rows of teeth 11 and an integral bearing member 12 provided with suitable bearing lugs 13. Mounted on the bearing lugs are springs 14, terminating in a swinging jaw 15, having a bracing member 16 thereon. Mounted to swing at the other end of the fixed jaw 10 is a supporting member 17, and mounted on the supporting member is a tripping rod 18 provided with an integral hook 19. A tripping plate 20 is provided, having one end thereof hingedly mounted on the fixed jaw 10 at points 21, and the other end thereof provided with a notch 22 adapted to releasably hold the tripping rod 18, as will be easily seen in Fig. 1.

To set the trap, the swinging jaw 15 is moved upwardly against the pressure exerted by the springs 14, and the supporting member is also moved upwardly, so that the hook 19 engages the swinging jaw 15 to releasably hold the same, and the tripping rod 18 engages the plate 20 at the notch 22. When the trap is thus set, the plate 20 will be disposed upwardly at a slight angle and any pressure exerted on the plate from above, will immediately disengage the tripping rod from the plate, and this movement will in turn release the swinging jaw 15 from the hook 19, thus permitting the jaw 15 to fall and engage the jaw 10. It will be easily seen that when an animal walks into the described trap, and the same operates as mentioned, the jaw 15 actuated by the springs 14, will securely hold the animal between the fixed jaw 10 and the jaw 15, thus preventing its escape.

For the purpose of preventing the plate 20 from passing beneath the fixed jaw when the plate is stepped upon, a retaining lug 23 is provided and integrally formed on the jaw 10.

When folded, the trap presents a compact device with the various parts lying flat against the jaw or base 10.

Having thus described my invention, I claim as new and desire to secure by Letters Patent:

A trap comprising a fixed jaw forming a base member, rows of integrally formed teeth on the said base member, a swinging jaw comprising a spring portion mounted on the said base member, a supporting frame pivoted to an opposite portion of the said base member from which the said swinging jaw is pivoted, a tripping rod having a portion thereof in engagement with the said supporting member, the end of the tripping rod being bent over the said supporting member at a substantially central portion thereof to form a hook, a tripping plate pivotally mounted at one end of the said base member adjacent the pivotal support of the said supporting member, the said tripping rod being in engagement with one end of the said tripping plate, the said tripping plate lying between the said teeth on the said base member whereby, as the tripping plate is depressed, the tripping rod and the said supporting member will be moved thereby carrying the said hook member out of engagement with the said swinging jaw and thereby operating the trap.

In testimony whereof I have signed my name to this specification in the presence of two subscribing witnesses.

THOMAS H. TAYLOR.

Witnesses:
E. DAYTON,
JOSEPH B. WIGLEY.

Copies of this patent may be obtained for five cents each, by addressing the "Commissioner of Patents, Washington, D. C."